Patented Feb. 9, 1954

2,668,813

UNITED STATES PATENT OFFICE 2,668,813

BASIC KETONES AND SALTS THEREOF

Moses Wolf Goldberg, Upper Montclair, and Albert Israel Rachlin, Hackensack, N. J., assignors to Hoffmann-La Roche Inc., Nutley, N. J., a corporation of New Jersey No Drawing. Application July 21, 1952, Serial No. 300,120

10 Claims. (Cl. 260—240)

This invention relates to novel chemical compounds, and more particularly, it relates to basic ketones and their acid addition salts wherein one valence of the keto group is attached to a lower alkoxyphenyl radical substituted in the alkyl portion thereof by the basic radical of a secondary amine and the other valence of the keto group is attached to a styryl radical or to a styryl radical carrying at least one nuclear substituent selected from the class consisting of nitro, halogen and lower alkoxy. Free bases of the invention can be represented by the formula (I)
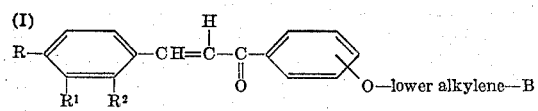

wherein R, $R^1$ and $R^2$ each represents hydrogen or nitro or halogen (e. g. chloro or bromo) or lower alkoxy (e. g. methoxy or n-butoxy); and B represents the radical of a secondary amine attached by the nitrogen atom to the lower alkylene group, e. g. a dialkylamino radical such as dimethylamino, or a heterocyclic secondary amino radical such as 1,2,3,4-tetrahydroquinolyl, piperidyl or morpholinyl.

The invention also embraces acid addition salts of the above mentioned novel bases with acids, e. g. mineral acids and organic acids, such as hydrochloric acid, sulfuric acid, acetic acid, oxalic acid, citric acid and the like.

The compounds of the invention are antifungal and antiprotozoal substances (active for instance against *Trichophyton mentagrophytes*, *Microsporon lanosum* and *Trichomonas vaginalis*), and are useful as pharmaceuticals.

In general, the new compounds can be made by reacting an alkali metal salt of a hydroxyphenyl styryl ketone or of a hydroxyphenyl substituted-styryl ketone with a haloalkane substituted by the basic radical of a secondary amine, as illustrated by the general equation (II)
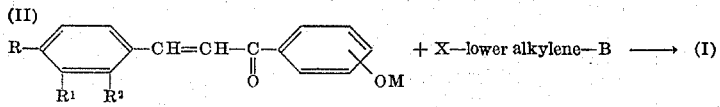

wherein M represents an alkali metal, X represents a halogen, and R, $R^1$ and $R^2$ and B have the same meanings assigned to them above.

Certain of the intermediates used in practicing the invention are novel with us, and for completeness of disclosure, the preparation thereof is described below.

A. To a stirred solution of 10 g. of sodium hydroxide in 100 cc. of water (30°) was added 13.6 g. (0.1 m.) of p-hydroxyacetophenone and 50 cc. of ethanol. 2,4-dichlorobenzaldehyde (17.5 g., 0.1 m.) was added and the solution was stirred at room temperature for 20 hours. The solution was poured into 2 liters of water and, with stirring, the mixture was acidified to Congo red with hydrochloric acid. The product was filtered, washed with 500 cc. of water and then it was partially dried. The slightly damp product was recrystallized from 1500 cc. of methanol to yield 4-hydroxyphenyl 2,4-dichlorostyryl ketone. M. P. 175–176° C.

B. To a stirred solution of 20 g. of sodium hydroxide in 200 cc. of water (30°) was added 27.2 g. (0.2 m.) of p-hydroxyacetophenone and 75 cc. of ethanol. o-Chlorobenzaldehyde (28.1 g., 0.2 m.) was added and the solution was stirred at room temperature for twenty hours. The solution was poured into 2 liters of water and the mixture was acidified with carbon dioxide. The product was filtered, washed with 500 cc. of water, and then it was air dried. Recrystallized from 200 cc. of ethanol, the product, p-hydroxyphenyl 2-chlorostyryl ketone, melted at 170° C.

C. To a stirred solution of 20 g. of sodium hydroxide in 200 cc. of water (30°) was added 27.2 g. (0.2 m.) of p-hydroxyacetophenone and 75 cc. of ethanol. p-chlorobenzaldehyde (28.1 g., 0.2 m.) was added and the solution was stirred at room temperature for twenty hours. The solution was poured into 2 liters of water and, with stirring, the mixture was acidified to Congo red with hydrochloric acid. The product was filtered, washed with 500 cc. of water, and then it was air dried. Recrystallized from 350 cc. of ethanol, the product, p-hydroxyphenyl p-chlorostyryl ketone, melted at 188–190°.

D. To a stirred solution of 20 g. of sodium hydroxide in 200 cc. of water (30°) was added 27.2 g. (0.2 m.) of p-hydroxyacetophenone and 75 cc. of ethanol. m-Nitrobenzaldehyde (30.2 g., 0.2 m.) was added and the slurry was stirred at room temperature for twenty hours. The slurry was poured into 4 liters of water and, with stirring, the mixture was acidified to Congro red with hydrochloric acid. The product was filtered, washed with 1 liter of water, and then it was air dried to yield p-hydroxyphenol m-nitrostyryl ketone, M. P. 228–230° C.

E. A mixture of 200 cc. of 10 percent sodium hydroxide solution, 27.2 g. (0.2 m.) of m-hydroxyacetophenone, 28.8 g. (0.2 m.) of 2,4-dichlorobenzaldehyde and 200 cc. of ethanol was stirred and refluxed for twenty hours. The solution was poured into 3 liters of water and, with stirring, the mixture was acidified to pH 6 with hydrochloric acid. The product, which solidified on standing, was filtered, washed with 500 cc. of water, and then it was air dried. Recrystallized from a mixture of 400 cc. of glacial acetic acid and 175 cc. of water, the product, m-hydroxyphenyl 2,4-dichlorostyryl ketone, melted at 121–124° C.

F. A mixture of 200 cc. of 10 percent sodium hydroxide solution, 27.2 g. (0.2 m.) of m-hydroxyacetophenone, 28.1 g. (0.2 m.) of o-chlorobenzaldehyde and 200 cc. of ethanol was stirred and refluxed for twenty hours. The solution was poured into 3 liters of water and, with stirring, the mixture was acidified to pH 6 with carbon dioxide. The product, which solidified on standing, was filtered, washed with 500 cc. of water, and then it was air dried. Recrystallized from a mixture of 300 cc. of glacial acetic acid and 150 cc. of water, the product, m-hydroxyphenyl 2-chlorostyryl ketone, melted at 115–117° C.

The invention is further disclosed in the following examples, which are illustrative but not limitative thereof. All melting points are corrected.

Example 1

Sodium methoxide (37 g., 0.69 m.) was added to a solution of 147 g. (0.656 m.) of p-hydroxyphenyl styryl ketone [Kostanecki et al., Ber. 32, 1924 (1899)] in 2 liters of chlorobenzene contained in a 5 liter stirred flask equipped with a downward condenser. Chlorobenzene was distilled off at atmospheric pressure until 800 cc. of distillate had been collected. The slurry of the sodium salt was stirred while it was allowed to cool to room temperature.

Meanwhile free p-diethylaminoethyl chloride was liberated from the hydrochloride as follows: 225 g. (1.31 m.) of crude $\beta$-diethylaminoethyl chloride hydrochloride was suspended in 400 cc. of ice-cold chlorobenzene. Two-hundred cc. of 50 percent sodium hydroxide solution was added in portions with stirring, the entire mixture being kept cold in an ice bath. The top layer was decanted through a sintered glass funnel. The bottom aqueous layer was extracted three times with 200 cc. portions of chlorobenzene. All the chlorobenzene extracts were combined and dried over magnesium sulfate in a refrigerator.

The chlorobenzene solution of the $\beta$-diethylaminoethyl chloride was filtered from the magnesium sulfate, the filtrate was added to the slurry of the sodium salt of p-hydroxyphenylstyryl ketone, and the mixture was stirred and refluxed for four hours. The chlorobenzene was removed by steam distillation and the residue was allowed to cool to room temperature. The oily base was extracted into two 400 cc. portions of ether, the combined ether extracts were dried over magnesium sulfate, and the solvent was removed in vacuo. The crude base was dissolved in 400 cc. of ethanol, a solution of 33 g. (0.665 m.) of oxalic acid dihydrate in 250 cc. of warm ethanol was added, and the resulting solution was allowed to cool to 30° C. Ether (600 cc.) was added, the slightly turbid solution was seeded, and the mixture was allowed to stand in a cool place to crystallize. The product, p-($\beta$-diethylaminoethoxy)phenyl styryl ketone oxalate, had a melting point of 152–153° C.

Four grams of the oxalate were partitioned between 120 cc. of ether, 150 cc. of water and 10 cc. of 50 percent sodium hydroxide solution. The ether layer was dried over magnesium sulfate and, after removal of the solvent, the residue was dissolved in 3 cc. of ethanol and this solution was treated with 3 cc. of 20 percent alcoholic hydrogen bromide. On cooling, the solution set to a mass of white crystals. The product, p-($\beta$-diethylaminoethoxy)phenyl styryl ketone hydrobromide, recrystallized from 75 cc. of ethanol, melted at 170–172° C.

Example 2

Sodium hydroxide solution (4 cc., 50 percent concentration) was added to a solution of 12.7 g. (0.05 m.) of p-hydroxyphenyl p-methoxystyryl ketone (Hiemesch et al., Chem. Zentralblatt 1925, I, 1201) in 300 cc. of chlorobenzene contained in a 500 cc. stirred flask equipped with a downward condenser. The mixture was distilled at atmospheric pressure until 200 cc. of distillate had been collected. The slurry of the sodium salt was stirred while it was allowed to cool to room temperature.

A chlorobenzene solution of $\beta$-diethylaminoethyl chloride (liberated in the manner described in Example 1 from 17.2 g., 0.1 m. of crude hydrochloride) was added to the slurry of the sodium salt of p-hydroxyphenyl p-methoxystyryl ketone and the mixture was stirred and refluxed for four hours. The chlorobenzene was removed by steam distillation and the residue was allowed to cool to room temperature. The oily base was extracted into three 200 cc. portions of ether, the combined ether extracts were dried over magnesium sulfate, and the solvent was removed in vacuo. The crude base was dissolved in 100 cc. of ethanol, 70 cc. of 27 percent ethanolic hydrogen bromide was added and, after treatment with 100 cc. of ether, a crystalline product separated. Recrystallized from 100 cc. of ethanol, the product, p - ($\beta$ - diethylaminoethoxy)phenyl p-methoxystyryl ketone hydrobromide, melted at 134–136° C.

Example 3

Sodium hydroxide solution (4 cc., 50 percent concentration) was added to a solution of 15.7 g. (0.054 m.) of 4-hydroxyphenyl 2,4-dichlorostyryl ketone in 300 cc. of chlorobenzene contained in a 500 cc. stirred flask equipped with a downward condenser. The mixture was distilled at atmospheric pressure until 200 cc. of distillate had been collected. The slurry of the sodium salt was stirred while it was allowed to cool to room temperature.

A chlorobenzene solution of $\beta$-diethylaminoethyl chloride (liberated in the manner described in Example 1 from 21 g., 0.12 m. of crude hydrochloride) was added to the slurry of the sodium salt of 4-hydroxyphenyl 2,4-dichlorostyryl ketone and the mixture was stirred and refluxed for four hours. The chlorobenzene was removed by steam distillation and the residue was allowed to cool to room temperature. The oily base was extracted into three 200 cc. portions of ether, the combined ether extracts were dried over magnesium sulfate, and the solvent was removed in vacuo. The crude base was dissolved in 25 cc. of ethanol, 50 cc. of 27 percent ethanolic hydrogen bromide was added and, after standing for several hours in a cool place, a mass of light yellow crystals separated. Recrystallized from 200 cc. of ethanol, the product, p - (β - diethylaminoethoxy) phenyl 2,4-dichlorostyryl ketone hydrobromide, melted at 191–194° C.

Example 4

Sodium methoxide (8.2 g., 0.152 m.) was added to a solution of 43 g. (0.147 m.) of 4-hydroxyphenyl 2,4-dichlorostyryl ketone in 600 cc. of chlorobenzene contained in a 2 liter stirred flask equipped with a downward condenser. Chlorobenzene was distilled at atmospheric pressure until 300 cc. of distillate had been collected. The slurry of the sodium salt was stirred while it was allowed to cool to room temperature.

A chlorobenzene solution of β-diethylaminoethyl chloride (liberated in the manner described in Example 1 from 48 g., 0.28 m. of crude hydrochloride) was added to the slurry of the sodium salt of 4-hydroxyphenyl 2,4-dichlorostyryl ketone and the mixture was stirred and refluxed for four hours. The chlorobenzene was removed by steam distillation and the residue was allowed to cool to room temperature. The oily base was extracted into two 300 cc. portions of ether, the combined ether extracts were dried over magnesium sulfate, and the solvent was removed in vacuo. The crude base was dissolved in 100 cc. of ethanol, a solution of 21 g. (0.164 m.) of oxalic acid dihydrate in 75 cc. of hot ethanol was added, and the resulting solution was allowed to cool to 30°. Ether (250 cc.) was added and the slightly turbid solution, on scratching, deposited a mass of crystals. Recrystallized from 400 cc. of ethanol, the product, p-(β-diethylaminoethoxy)-phenyl 2,4-dichlorostyryl ketone oxalate, melted at 91–93° C.

When the material was spread out in a thin layer and was allowed to air dry for several days, it melted at 126–129° C.

Example 5

Sodium hydroxide solution (5.5 cc., 50 percent concentration) was added to a solution of 25.85 g. (0.1 m.) of p-hydroxyphenyl o-chlorostyryl ketone in 300 cc. of chlorobenzene contained in a 500 cc. stirred flask equipped with a downward condenser. The mixture was distilled at atmospheric pressure until 200 cc. of distillate had been collected. The slurry of the sodium salt was stirred while it was allowed to cool to room temperature.

A chlorobenzene solution of β-diethylaminoethyl chloride (liberated in the manner described in Example 1 from 34.4 g., 0.2 m. of crude hydrochloride) was added to the slurry of the sodium salt of p-hydroxyphenyl o-chlorostyryl ketone and the mixture was stirred and refluxed for four hours. The chlorobenzene was removed by steam distillation and the residue was allowed to cool to room temperature. The oily base was extracted with three 200 cc. portions of ether, the combined ether extracts were dried over magnesium sulfate, and the solvent was removed in vacuo. The crude base was dissolved in 50 cc. of ethanol, 50 cc. of 27 percent ethanolic hydrogen bromide was added and, after standing several hours in a cool place, a mass of crystals separated. Recrystallized from a mixture of 700 cc. of ethanol and 25 cc. of water, the product, p-(β-diethylaminoethoxy) phenyl 2-chlorostyryl ketone hydrobromide, melted at 197–199° C.

Example 6

Sodium hydroxide solution (7 cc., 50 percent concentration) was added to a solution of 21.5 g. (0.08 m.) of p-hydroxyphenyl 3-nitrostyryl ketone in 300 cc. of chlorobenzene contained in a 500 cc. stirred flask equipped with a downward condenser. The mixture was distilled at atmospheric pressure until 200 cc. of distillate had been collected. The slurry of the sodium salt was stirred while it was allowed to cool to room temperature.

A chlorobenzene solution of β-diethylaminoethyl chloride (liberated in the manner described in Example 1 from 43.5 g., 0.16 m. of crude hydrochloride) was added to the slurry of the sodium salt of p-hydroxyphenyl 3-nitrostyryl ketone and the mixture was stirred and refluxed for 4 hours. The chlorobenzene was removed by steam distillation and the residue was allowed to cool to room temperature. The crystalline base was filtered, washed with water and dried. The crude base was dissolved in 100 cc. of ethanol, 25 cc. of 27 percent ethanolic hydrogen bromide was added and, after standing several hours in a cool place, a mass of crystals of p-(β-diethylaminoethoxy)phenyl-3-nitrostyryl ketone hydrobromide, M. P. 202–204° C. separated.

Example 7

Sodium hydroxide solution (6 cc., 50 percent concentration) was added to a solution of 25.85 g. (0.1 m.) of p-hydroxyphenyl p-chlorostyryl ketone in 300 cc. of chlorobenzene contained in a 500 cc. stirred flask equipped with a downward condenser. The mixture was distilled at atmospheric pressure until 200 cc. of distillate had been collected. The slurry of the sodium salt was stirred while it was allowed to cool to room temperature.

A chlorobenzene solution of β-diethylaminoethyl chloride (liberated in the manner described in Example 1 from 34.4 g., 0.2 m. of crude hydrochloride) was added to the slurry of the sodium salt of p-hydroxyphenyl p-chlorostyryl ketone and the mixture was stirred and refluxed for four hours. The chlorobenzene was removed by steam distillation and the residue was allowed to cool to room temperature. The crystalline base was filtered, washed with water and dried. The crude base was dissolved in 90 cc. of ethanol, 35 cc. of 27 percent ethanolic hydrogen bromide was added, and after standing several hours in a cool place, a mass of p-(β-diethylaminoethoxy)phenyl p-chlorostyryl ketone hydrobromide crystals, M. P. 165–166° C., separated.

Example 8

To a solution of 29.3 g. (0.1 m.) of m-hydroxyphenyl 2,4-dichlorostyryl ketone in 200 cc. of ethanol was added 6 g. (0.11 m.) of sodium methoxide. A chlorobenzene solution of β-diethylaminoethyl chloride (liberated in the manner described in Example 1 from 24.4 g., 0.2 m. of crude hydrochloride) was added to the solution of the sodium salt of m-hydroxyphenyl 2,4-dichlorostyryl ketone and the mixture was stirred and refluxed for four hours. The mixture was cooled, treated with 500 cc. of ether to complete the precipitation of the sodium chloride, filtered, and the filtrate was evaporated in vacuo. The residue was dissolved in 100 cc. of ethanol, a solution of 15 g. of oxalic acid dihydrate in 80 cc. of ethanol was added and, after 350 cc. of ether had been added, the turbid solution was allowed to stand in a cool place to crystallize. The crude product was recrystallized from a mixture of 900 cc. of ethanol and 20 cc. of water to give m-(β-diethylaminoethoxy)phenyl 2,4-dichlorostyryl ketone oxalate, M. P. 148–151° C.

*Example 9*

To a solution of 18.1 g. (0.07 m.) of m-hydroxyphenyl 2-chlorostyryl ketone in 200 cc. of ethanol was added 4.7 g. (0.07 m.) of sodium methoxide. A chlorobenzene solution of β-diethylaminoethyl chloride (liberated in the manner described in Example 1 from 24 g., 0.14 m. of crude hydrochloride) was added to the solution of the sodium salt of m-hydroxyphenyl 2-chlorostyryl ketone and the mixture was stirred and refluxed for four hours. The mixture was cooled, treated with 500 cc. of ether to complete the precipitation of the sodium chloride, filtered, and the filtrate was evaporated in vacuo. The residue was dissolved in 100 cc. of ethanol, a solution of 10 g. of oxalic acid dihydrate in 100 cc. of ethanol was added and, after 300 cc. of ether had been added, the turbid solution was allowed to stand in a cool place to crystallize. The crude product was recrystallized from 350 cc. of isopropanol to give m-(β-diethylaminoethoxy)phenyl 2-chlorostyryl ketone oxalate, M. P. 121–124° C.

*Example 10*

To a solution of 11.2 g. (0.05 m.) of 2-hydroxyphenyl styryl ketone [Feuerstein et al., Ber. 31, 715 (1898)] in 250 cc. of ethanol was added 3 g. (0.055 m.) of sodium methoxide. A chlorobenzene solution of β-diethylaminoethyl chloride (liberated in the manner described in Example 1 from 17.2 g., 0.1 m. of crude hydrochloride) was added to the solution of the sodium salt of 2-hydroxyphenyl styryl ketone and the mixture was stirred and refluxed for four hours. The mixture was cooled, treated with 500 cc. of ether to complete the precipitation of sodium chloride, filtered, and the filtrate was evaporated in vacuo. The residue was dissolved in 100 cc. of ethanol, a solution of 6.3 g. of oxalic acid dihydrate was added and the solution was allowed to stand in a cool place to crystallize. The crude product was recrystallized from a mixture of 250 cc. of benzene and 40 cc. of ethanol to give o-(β-diethylaminoethoxy)phenyl styryl ketone oxalate, M. P. 113–114° C.

*Example 11*

A mixture of 33.6 g. (0.15 m.) of p-hydroxyphenyl styryl ketone (see Example 1), 350 cc. of chlorobenzene and 8.4 g. (0.155 m.) of sodium methoxide was stirred and heated to the boiling point. The resulting slurry of the sodium salt of p-hydroxyphenyl styryl ketone was allowed to cool to 40°, 26.5 g. (0.177 m.) γ-morpholinyl-propyl chloride was added and the mixture was stirred and refluxed for eighteen hours. After removing the sodium chloride by filtration, the mother liquor was evaporated in vacuo. The residue, crude p-[γ-(4-morpholyl)propoxy]phenyl styryl ketone, set to a mass of crystals. Recrystallized from 350 cc. of ethanol, the product had a melting point of 89–91° C.

A solution of 41.5 g. (0.118 m.) of the base (melting point 89–91° C., obtained above) in 300 cc. of warm ethanol was added to a solution of 26 g. (0.124 m.) of citric acid monohydrate in 100 cc. of ethanol. The p-[γ-(4-morpholinyl)propoxy]phenyl styryl ketone citrate, which separated on cooling, was recrystallized from a mixture of 700 cc. of ethanol and 100 cc. of water. M. P. 151–153° C. with decomposition.

*Example 12*

By a procedure similar to that described in Example 11, 29.1 g. (0.13 m.) of p-hydroxyphenyl styryl ketone (see Example 1) and 21.4 g. (0.145 m.) of 3-chloropropylpiperidine were reacted to yield p-[γ-(1-piperidyl)propoxy]phenyl styryl ketone ethanolate. M. P. 58–62° C. recrystallized from ethanol.

By treating the crystalline base (M. P. 58–62° C., obtained above) with citric acid monohydrate, in a manner similar to that described in Example 11, there was obtained p-[γ-(1-piperidyl)-propoxy]phenyl styryl ketone citrate. M. P. 109–113° C. with decomposition.

*Example 13*

The free base p-(γ-diethylaminopropoxy)-phenyl styryl ketone was prepared by a procedure similar to that described in Example 11. From 33.6 g. (0.15 m.) of p-hydroxyphenyl styryl ketone (see Example 1) and 24.6 g. (0.182 m.) of 3-chloropropyl-N-diethylamine there was obtained 47 g. of the oily base. The base was converted to p-(γ-diethylaminopropoxy)phenyl styryl ketone citrate in the manner described in Example 11, by treatment with citric acid monohydrate. M. P. of the citrate, 142–143° C. with decomposition.

*Example 14*

The free base p-(β-dimethylaminoethoxy)-phenyl styryl ketone was prepared by a procedure similar to that described in Example 11. From 33.6 g. (0.15 m.) of p-hydroxyphenyl styryl ketone (see Example 1) and β-dimethylaminoethyl chloride (liberated from 43 g., 0.3 m. of the hydrochloride) there was obtained 41 g. of crude crystalline base, M. P. 67.5–70° C. The base was converted to the citrate in the manner described in Example 11. M. P. 132–134° C.

We claim:

1. A compound selected from the group consisting of bases having the following formula

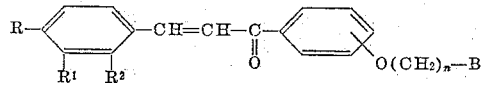

and their acid addition salts; wherein R, $R^1$ and $R^2$ each represents a member of the group consisting of hydrogen, lower alkoxy, halogen and nitro, n represents an integer from 2 to 3 inclusive, and B represents a radical of the group consisting of di(lower alkyl)amino, 4-morpholinyl and 1-piperidyl.

2. A basic ketone having one valence of the keto group attached to a lower alkoxyphenyl radical having from two to three carbon atoms in the alkyl portion thereof and substituted in the alkyl portion thereof by a di(lower alkyl)amino radical, and having the other valence of the keto group attached to the styryl radical.

3. An acid addition salt of a compound according to claim 2.

4. A basic ketone having one valence of the keto group attached to a lower alkoxyphenyl radical having from two to three carbon atoms in the alkyl portion thereof and substituted in the alkyl portion thereof by a di(lower alkyl)amino radical, and having the other valence of the keto group attached to the 2,4-dichlorostyryl radical.

5. An acid addition salt of a compound according to claim 4.

6. β-Di-(lower alkyl)aminoethoxyphenyl styryl ketone.

7. An acid addition salt of a compound according to claim 6.

8. p-(β-Diethylaminoethoxy)phenyl styryl ketone oxalate.

9. p-(β-Diethylaminoethoxy)phenyl 2,4-dichlorostyryl ketone oxalate.

10. p-[γ-(1-piperidyl)propoxy]phenyl styryl ketone citrate.

MOSES WOLF GOLDBERG.
ALBERT ISRAEL RACHLIN.

References Cited in the file of this patent

UNITED STATES PATENTS

| Number | Name | Date |
|---|---|---|
| 1,894,865 | Hartmann et al. | Jan. 17, 1933 |